I. F. KEPLER.
STEERING GEAR LOCK FOR MOTOR VEHICLES.
APPLICATION FILED JUNE 7, 1917.
1,253,498.
Patented Jan. 15, 1918.
2 SHEETS—SHEET 1.
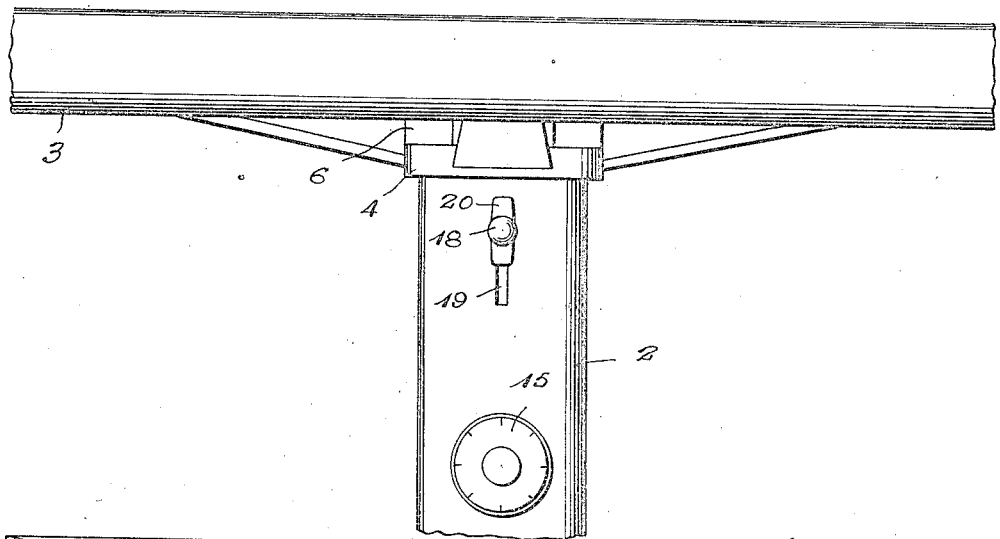
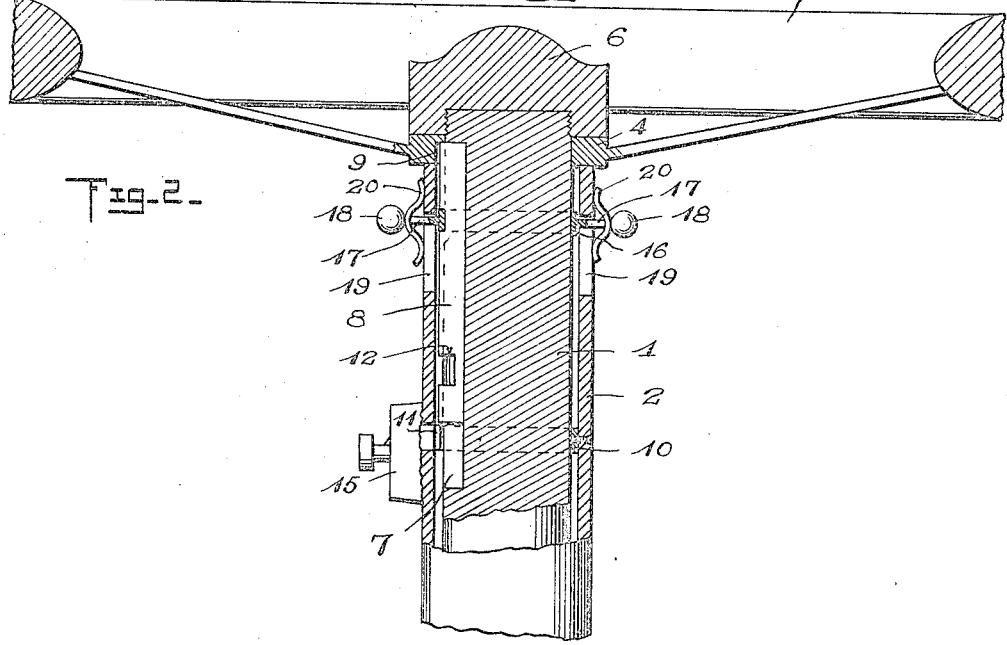
Witness
Evans D. Haines.
Inventor
Irwin F. Kepler.
By H. B. Willson & Co.
Attorneys

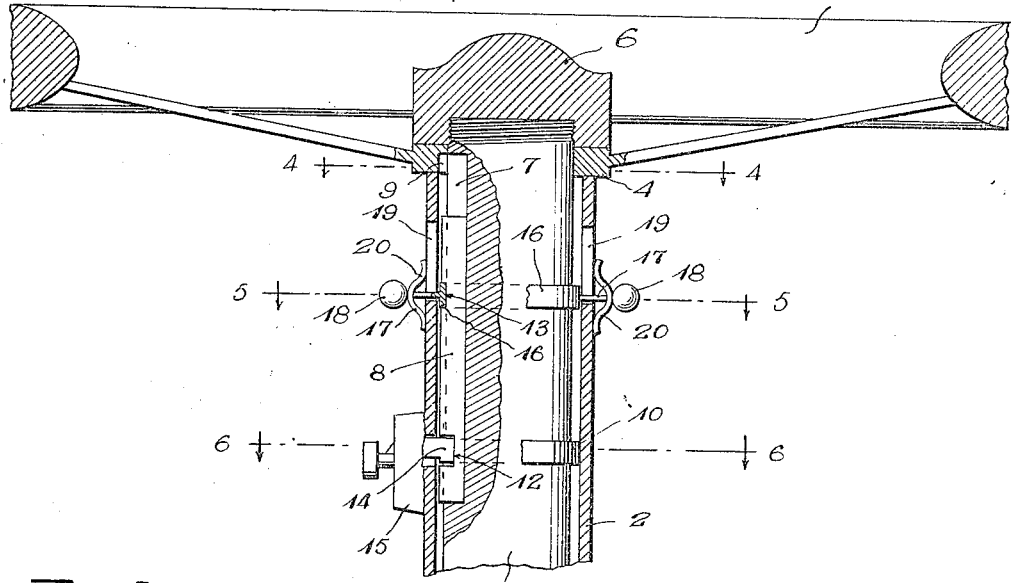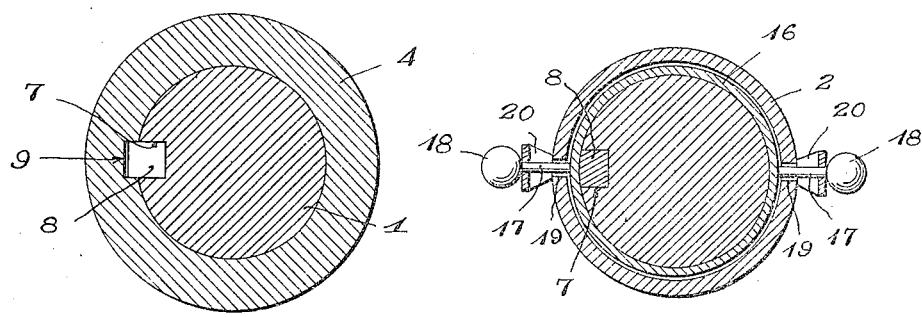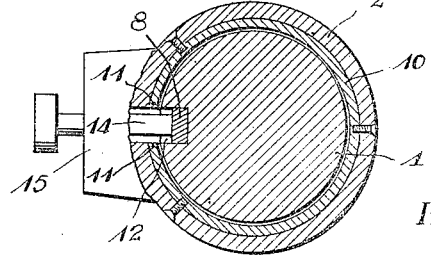

UNITED STATES PATENT OFFICE.

IRWIN FLOYD KEPLER, OF AKRON, OHIO.

STEERING-GEAR LOCK FOR MOTOR-VEHICLES.

1,253,498.     Specification of Letters Patent.     Patented Jan. 15, 1918.

Application filed June 7, 1917. Serial No. 173,327.

*To all whom it may concern:*

Be it known that I, IRWIN FLOYD KEPLER, a citizen of the United States, residing at Akron, in the county of Summit and State of Ohio, have invented certain new and useful Improvements in Steering-Gear Locks for Motor-Vehicles; and I do declare the following to be a full, clear, and exact description of the invention, such as will enable others skilled in the art to which it appertains to make and use the same.

This invention relates generally to motor driven vehicles, but more particularly to certain new and useful improvements in steering gear locks for the same.

One object of the invention is to provide a means whereby the steering gear of a motor driven vehicle may be effectively locked when the machine is to be parked, said means accomplishing its purpose by locking the steering post against rotation and by unlocking the steering wheel from the steering post.

Another object of the invention is to provide a locking device of this character whereby the locking member can only be brought into its locking position when the front wheels of the vehicle have been turned a considerable distance to one side, this obviously not only preventing the steering mechanism from being operated, but also insuring the machine from being towed away.

A further object of the invention is to improve upon devices of this general class by the provision of an extremely simple, strong, durable and inexpensive construction, one which will be efficient and reliable in operation, and well adapted to the purpose for which it is designed.

With these and other objects in view, the invention resides in certain novel features of construction, and the combination and arrangement of parts as will be hereinafter fully described and claimed.

In the accompanying drawings in which similar reference characters are used to designate like parts throughout the several views:—

Figure 1 is a front elevation of a portion of the steering column of an automobile, an edge view of the steering wheel thereof, showing a device constructed in accordance with this invention used in connection with the same;

Fig. 2 is a vertical sectional view through the steering post column and other parts of the steering gear illustrating the internal construction of the invention, the locking member being shown in its unlocked position;

Fig. 3 is a similar view showing the locking member in its locked position;

Figs. 4, 5 and 6 are transverse sectional views through the steering post column, taken on the planes indicated by the lines 4—4, 5—5 and 6—6 of Fig. 3.

Referring more particularly to the drawings, certain portions of the steering gear of an automobile are shown, the numeral 1 designating the steering post, 2 the steering post column or casing which surrounds and protects the steering post 1, and 3 the steering wheel, which being of substantially the ordinary construction, is provided with an inner hub member 4. The lower side of the hub 4 of the steering wheel 3 rests upon the upper end of the steering post column 2, thus forming a means for supporting the steering wheel. Fixed to the upper end of the steering post 1 in any suitable manner is a cap 6, the lower side of which bears loosely upon the hub 4 of the steering wheel and prevents the latter from being entirely disengaged from either the steering post or the steering post column.

From Fig. 2 of the drawings, it will be seen that the steering post 1 is provided at its upper end and on one of its sides with a longitudinally extending channel or groove 7. This groove 7 is of rectangular-shaped configuration in cross section and is adapted to receive a slidable locking member or key 8. The length of the key 8 is less than that of the slot 7 for a purpose which will be hereinafter described.

Arranged in the inner side of the hub 4 of the steering wheel 3 is a channel or groove 9 which, when arranged adjacent the groove 7 in the steering post 1, is adapted to receive a portion of the locking member 8 to lock the steering wheel against rotation upon the steering post.

Secured to the interior side of the steering post column 2 in any convenient manner is a ring or band 10. The ring 10 is disposed at such a distance below the steering wheel that when the locking member 8 is in its uppermost position, the lower end of the latter will rest upon the upper edge of the ring. The locking member 8 will thus be prevented from becoming accidentally disengaged from the hub 4 of the steering wheel so that the vehicle may be effectively steered by the latter. The ring 10 is split, the spaced meeting ends 11 being disposed adjacent one side of the steering post column 2, it being understood that the locking member 8 is disposed upon the side of the steering post 1 which faces the driver of the machine. The meeting ends 11 of the ring 10 are spaced apart a sufficient distance to allow the locking member 8 to be disposed between them when said member is brought into alinement with them and moved to its lowermost position. This alining can only be done by operating the steering wheel so as to cause the steering post to be revolved a considerable distance, and consequently turning the front wheels of the automobile a considerable distance to one side. As clearly shown in Fig. 3 of the drawings, when the locking member 8 is in its lowermost position, its upper end is disengaged from the groove 9 in the hub 4 of the steering wheel, and the latter is then free to rotate upon the steering post so that upon its rotation the automobile cannot be steered.

The outer edge of the locking member 8 is provided with a pair of spaced notches 12 and 13, the notch 12 being disposed near the lower end of the member and being adapted to receive the bolt 14 of a lock 15 when said member is in its lowermost position and disposed between the spaced ends 11 of the rings 10. This lock 15 may be of any suitable type, but is preferably in the form of a permutation lock operated by clicks, and is securely fastened to the steering post column 2 in front of the driver of the automobile. It is to be noted that when the dial or knob of the lock 15 is operated, the bolt 14 will be retracted. When the member 8 is in its uppermost position, the lock may be locked so as to dispose the bolt 14 between the ends of the ring 10 with its upper edge flush with the upper edge of the latter. This prevents the member 8 from falling by gravity into the space between the ends of the ring 10 should the steering wheel be turned far enough to bring said member into alinement with said space between the ends of said ring 10.

The notch 13 is adapted to receive a ring or band 16 which surrounds the steering post 1, it being disposed between the exterior side of the same and the interior side of the steering post column 2. Connected to the ring 16 at suitable points are the shanks 17 of a pair of knobs 18. These shanks 17 extend through slots 19 arranged in the steering post column 2, the knobs 18 being disposed on the exterior of the same. To prevent these parts from rattling, suitable springs 20 may be inserted between the knobs 18 and the steering post column 2. This construction also provides a means for preventing the locking member 8 from dropping to its lowermost position by gravity, but the primary purpose of the knobs is to operate or move the locking member from one of its positions to the other.

When the automobile is to be used, the locking member 8 is to be disposed in its uppermost position so that its upper end will be received in the groove 9 in the hub 4 of the steering wheel. This, as has been already explained, locks the steering wheel to the steering post so that upon the movement of the former, the latter will be moved so as to impart the desired movement to the other parts of the steering gear of the machine. When the machine is to be parked, the steering wheel is turned a considerable distance toward the right or the left so as to turn the front wheels of the machine to the right or the left. This brings the locking member 8 into proper alinement with the socket formed between the meeting ends of the ring 10, in order to allow the member to be moved to its lowermost position. The notch 12 in the member 8 will then be positioned so as to receive the bolt 14 of the lock 15. The upper end of the member 8, as has been hereinbefore explained, is thus moved out of engagement with the socket or channel formed in the hub 4 of the steering wheel. The steering gear is effectively locked, and furthermore, the wheels of the machine are turned to such a considerable distance to the side that an attempt to move the car by towing would be fruitless. To unlock the steering gear it is only necessary to operate the lock 15, and to move the locking member 8 to its uppermost position.

From the foregoing description, taken in connection with the accompanying drawings, the construction, use and operation of the device will be readily understood without a more extended explanation.

As various changes in form, proportion, and in the minor details of construction may be resorted to without departing from the spirit of this invention, it is to be understood that I do not wish to be limited to the precise construction herein shown and described.

I claim:—

1. In a steering gear lock for motor vehicles, the combination with the steering post, the steering post column, and the steering wheel thereof; of a movable member associated therewith for locking the steering post against movement and simultaneously unlocking the steering wheel from the latter when said member is in one of its positions, and for unlocking the steering post and simultaneously locking the steering wheel to the steering post when said member is in its other position.

2. In a steering gear lock for motor vehicles, the combination with the steering post, the steering post column, and the steering wheel thereof; of a locking member slidably mounted upon the steering post, means carried by the steering post and steering wheel coacting with said member to lock the steering post to the steering post column and simultaneously unlock the steering wheel from the steering post when said member is in one of its positions, and to unlock the steering post and simultaneously lock the steering wheel to the latter when said member is in its other position, and means for locking said member in its first-mentioned position.

3. In a steering gear lock for motor vehicles, the combination with the steering post, the steering post column and steering wheel thereof; of a movable locking member slidably mounted upon the steering post and having a notch in one edge thereof, a split ring fixed to the interior side of the steering post column and having its ends spaced apart to receive said locking member when in one of its positions, a lock fixed to the steering post column and having its bolt adapted to project into the notch in the locking member when the latter is in the aforesaid position, and means carried by the steering wheel for engagement with said locking member when the latter is in its other position.

4. In a steering gear lock for motor vehicles, the combination with the steering post, the steering wheel, and the steering post column having a slot therein; of a locking member slidably mounted upon the steering post for locking the latter against movement and simultaneously unlocking the steering wheel from the same when said member is in one of its positions, and for unlocking the steering post and simultaneously locking the steering wheel to the steering post when in its other position, said member having a notch therein, a ring surrounding the steering post and received in said notch, a knob disposed on the exterior of the steering post column and having its shank extending through the slot therein and secured to said ring, a spring disposed between said knob and the exterior side of the steering post column, and means for locking said member in one of its positions.

In testimony whereof I have hereunto set my hand in the presence of two subscribing witnesses.

IRWIN FLOYD KEPLER.

Witnesses:
GEO. F. FRICKS,
CHARLES J. CAREY.